United States Patent [19]

Richter

[11] Patent Number: 4,498,417
[45] Date of Patent: Feb. 12, 1985

[54] SUPPLY APPARATUS FOR THE ENRICHMENT OF AQUARIUM WATER WITH $CO_2$-GAS

[75] Inventor: Arno Richter, Belm, Fed. Rep. of Germany

[73] Assignee: Warner-Lambert Company, Morris Plains, N.J.

[21] Appl. No.: 508,684

[22] Filed: Jun. 28, 1983

[30] Foreign Application Priority Data

Jun. 29, 1982 [DE] Fed. Rep. of Germany ....... 3224149

[51] Int. Cl.³ .............................................. A01K 63/04
[52] U.S. Cl. ...................................................... 119/5
[58] Field of Search ......................................... 119/5, 3

[56] References Cited

U.S. PATENT DOCUMENTS 2,824,728  2/1958  Crawford ........................... 119/5 X

FOREIGN PATENT DOCUMENTS 2554957  6/1977  Fed. Rep. of Germany .......... 119/5
2815832  10/1979  Fed. Rep. of Germany .......... 119/5
1642474  7/1981  Fed. Rep. of Germany .......... 119/5

Primary Examiner—Hugh R. Chamblee
Attorney, Agent, or Firm—Ronald A. Daignault

[57] ABSTRACT

A supply apparatus for the enrichment of aquarium water with $CO_2$ is described. For the purpose of increasing the diffusion surface, several containers open at the base are arranged above one another along a gas inlet pipe to be assembled essentially vertically. The $CO_2$ gas introduced into the bottom container displaces the water and subsequently fills the above-assembled containers in a cascade in a type of pneumatic tank. The thereby increased contact surface of $CO_2$/water effects a more rapid adjustment to the desired higher $CO_2$ concentration. See FIG. 1.

6 Claims, 4 Drawing Figures

SUPPLY APPARATUS FOR THE ENRICHMENT OF AQUARIUM WATER WITH CO₂-GAS

BACKGROUND ART

It is known from German DE-AS No. 16 42 474 that it is advantageous when keeping plants and animals in an aquarium, to constantly supply carbon dioxide gas to the aquarium water. It is advantageous if the gas treatment is effected by the $CO_2$ gas diffusing into the aquarium water via a contact surface.

It has been established that upon correct dosage of $CO_2$ gas not only the aquarium plants thrive well, but the increase in the oxygen content of the aquarium water resulting from the increased assimilation of carbon dioxide by plants also considerably improves the living conditions for aerobic organisms. The decisive factor here is that the diffusion speed of $CO_2$ always remains correctly adjusted.

Since larger aquariums also require a large contact surface, via which the $CO_2$ gas can diffuse into the aquarium water in order to safeguard a sufficient diffusion speed, an attempt has already been made in German DE-AS No. 16 42 474 to achieve such an enlargement of the contact surface by means of constructive alterations to the gas treatment equipment. However, this allows dimensions to be reached which leave no alternative other than housing the contact surface either outside the aquarium or on the base of aquarium. (compare FIG.4 and FIG. 6 of German DE-AS No. 16 42 474).

DISCLOSURE OF THE INVENTION

It is the object of the present invention to house the contact surface which is necessary for the transfer of $CO_2$ gas into the aquarium water within the smallest area and to arrange it so that the diffusion surface and thus under normal conditions the diffusion speed of the $CO_2$ gas always remains virtually constant and is not correlated with filling the space containing $CO_2$ gas.

I have discovered that it is possible to solve the task by assembling several containers which are closed at the top and open at the base above each other on a $CO_2$ inlet pipe to be assembled essentially vertically, so that $CO_2$ gas is introduced into the bottom container and, after filling one container, overflowing $CO_2$ gas is collected by the container immediately above in a type of pneumatic tank.

This allows a number of diffusion surfaces to be attained arranged above each other in the form of an inverted cascade within the smallest area, the sum of which can be precisely adapted according to the respective volume of the individual aquariums.

The form and arrangement of the containers is in itself of little relevance. However, for ease of construction, a form with a rectangular, and in particular a square or a circular cross-section is preferable. For the same reasons and also for easy mass production it is to be recommended that the containers are all made identical, so that the size of the equipment can be made varied at any time in line with the unit construction system.

BRIEF DESCRIPTION OF THE DRAWING

FIG. 2b is a cross-sectional view of 2a.

BEST MODE FOR CARRYING OUT THE INVENTION

Figure 1:
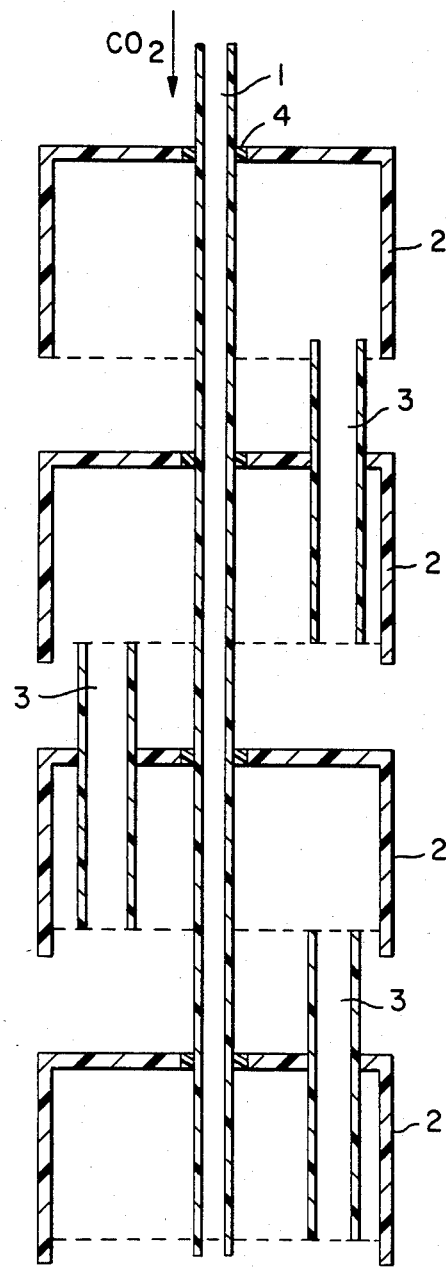
FIG. 1 is a cross-sectional view of container 2.

The arrangement as represented in FIG. 1 has particularly stood the test of time. An inlet pipe 1 for $CO_2$ is arranged centrally to the cylindrical or polyhedral containers 2, so that the individual containers 2 can be mounted via A flexible seals 4 as required. Every container 2 except the upper most one is equipped with an overflow pipe 3, which is fitted closely through the upper wall of the container and extends upward to the gas/water interface of the container above. As illustrated, each container is downwardly open but closed on its sides and top.

The $CO_2$ gas introduced from above through inlet pipe 1 into the waterfilled apparatus initially fills the lowest container 2 up to the lower end of overflow pipe 3. The $CO_2$ gas now escaping through this pipe is collected by the above-assembled container 2 in a type of pneumatic tank until the interface $CO_2$/water has again reached the lower end of the overflow pipe 3. The process continues upwards, until all containers have been filled. Excess $CO_2$ escapes via the edge of the uppermost container or via another overflow pipe 3 (not shown), which projects above the water surface of the aquarium.

The equipment should comprise approximately 3-5 containers according to the sizes of the aquariums respectively. This number has been found to be a favorable compromise with respect to the size of the equipment and the high diffusion speed strived for. The overall surface should be chosen in such a way as to allow a sustained concentraton of 5-15 mg. $CO_2$/liter to be attained in the aquarium.

It has proved preferential to manufacture the equipment out of nuetral synthetic materials using the injecting moulding procedure. Polystyrol and celluloseacetatate are particularly suitable. A further preferred form of construction is described in FIGS. 2a and 2b.

Figure 2A:
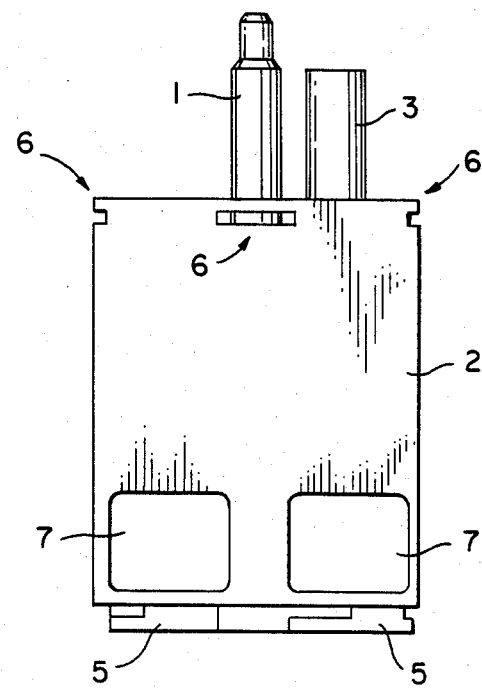
FIG. 2a is a side view of a container 2.

FIG. 2a shows the side elevation of a container 2 specially constructed to facilitate the joining together of several modular units. The gas inlet pipe 1 is tapered at its upper extremity so as to allow it to be inserted into the gas inlet pipe of the container to be mounted above it with a gastight fit. The overflow pipe 3 is mounted alongside the gas inlet pipe 1. Connection of the container 2 is achieved by engagement of a bayonet mount 5 in corresponding recesses 6 incorporated in the container immediately below it. An appropriate threaded screw-in connection may however also be used. The unobstructed passage of the aquarium water is provided for by several apertures 7 in the wall of the container 2.

Figure 2B:
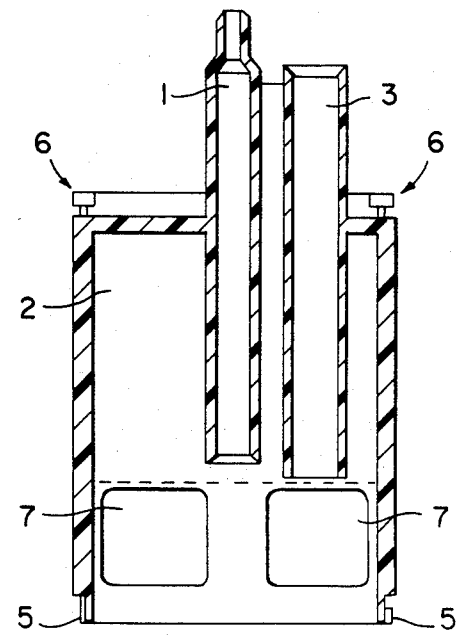
Figure 3:
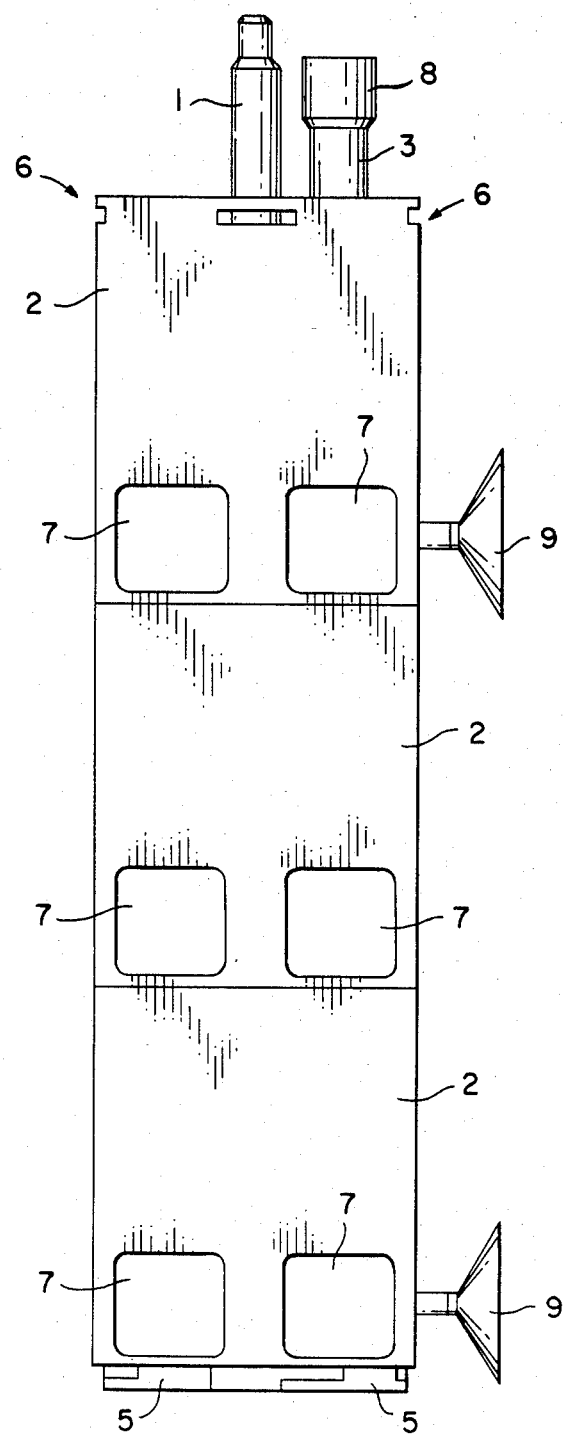
FIG. 3 is a side view of the container 2 adapted to be mounted to the side of a tank by suction cups 9.

FIG. 2b shows a sectional view of FIG. 2a. The $CO_2$/water interface which forms is indicated with a broken line slightly above the apertures 7. FIG. 3 shows several of the containers of FIGS. 2a and 2b assembled one above the other. Means such as suction cups 9 may be provided to attach the unit to the wall of an aquarium.

It is advantageous for easier control of the function to construct the equipment of transparent synthetic materials.

I claim:

1. Apparatus for enriching aquarium water with carbon dioxide gas, comprising:

an inlet conduit for carbon dioxide gas, said conduit being adapted to extend downwardly into the water of an aquarium;

a plurality of containers having open bases and closed sides and tops, said containers being arranged one above the other and positioned relative to said inlet conduit so that carbon dioxide gas issuing from said inlet conduit collects within and substantially fills a lower one of said containers to establish a first gas/water interface, said gas then overflowing said lower one of said containers to be collected within a higher container to establish a second gas/water interface; and an overflow conduit fitted through the wall of said lower one of said containers, the lower end of said overflow conduit extending to said first gas/water interface and the upper end of said overflow conduit extending to said second gas/water interface.

2. Apparatus according to claim 1, wherein said containers have rectangular cross-sections and said inlet conduit is positioned centrally.

3. Apparatus according to claim 2, wherein said containers are provided with means for connecting their upper and lower ends one above the other and said closed sides are provided with apertures for passage of aquarium water.

4. Apparatus according to claim 1, wherein said containers are provided with means for connecting their upper and lower ends one above the other and said closed sides are provided with apertures for passage of aquarium water.

5. Apparatus for enriching aquarium water with carbon dioxide gas, comprising:

an inlet conduit for carbon dioxide gas, said conduit being adapted to extend downwardly into the water of an aquarium;

a plurality of containers having open bases, closed sides with apertures for passage of aquarium water and tops, said containers being arranged one above the other and positioned relative to said inlet conduit so that carbon dioxide gas issuing from said inlet coduit collects within and substantially fills a lower one of said containers to establish a first gas/water interface, said gas then overflowing said lower one of said containers to be collected within a higher container to establish a second gas/water interface, said containers further comprising means for connecting their upper and lower ends one above the other.

6. Apparatus according to claim 5, wherein said containers are made from transparent synthetic material.

* * * * *